APPARATUS FOR LAUNCHING BALLOONS

INVENTORS
OTTO C. WINZEN
BY RAYMOND C. HAWKINS
Moore, White & Burd
ATTORNEYS

APPARATUS FOR LAUNCHING BALLOONS

Filed May 13, 1957

INVENTORS
OTTO C. WINZEN
BY RAYMOND C. HAWKINS
Moore, White & Burd
ATTORNEYS

Jan. 10, 1961 O. C. WINZEN ET AL 2,967,677

APPARATUS FOR LAUNCHING BALLOONS

Filed May 13, 1957 9 Sheets-Sheet 3

INVENTORS
OTTO C. WINZEN
BY RAYMOND C. HAWKINS
Moore, White & Burd
ATTORNEYS

Jan. 10, 1961 O. C. WINZEN ET AL 2,967,677

APPARATUS FOR LAUNCHING BALLOONS

Filed May 13, 1957 9 Sheets-Sheet 4

INVENTORS
OTTO C. WINZEN
BY RAYMOND C. HAWKINS
Moore, White & Bird
ATTORNEYS

INVENTORS
OTTO C. WINZEN
BY RAYMOND C. HAWKINS
Moore, White & Burd
ATTORNEYS

Jan. 10, 1961 O. C. WINZEN ET AL 2,967,677

APPARATUS FOR LAUNCHING BALLOONS

Filed May 13, 1957 9 Sheets-Sheet 6

INVENTORS
OTTO C. WINZEN
BY RAYMOND C. HAWKINS
Moore, White & Reed
ATTORNEYS

INVENTORS
OTTO C. WINZEN
BY RAYMOND C. HAWKINS
Moore, White & Burd
ATTORNEYS

INVENTORS
OTTO C. WINZEN
BY RAYMOND C. HAWKINS
Moore, White & Burd
ATTORNEYS

APPARATUS FOR LAUNCHING BALLOONS
Filed May 13, 1957 
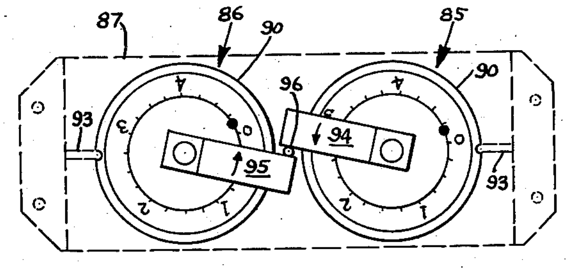
FIG. 16
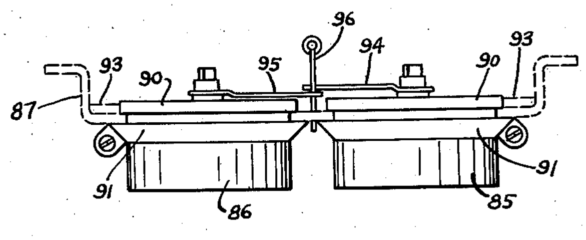
FIG. 17
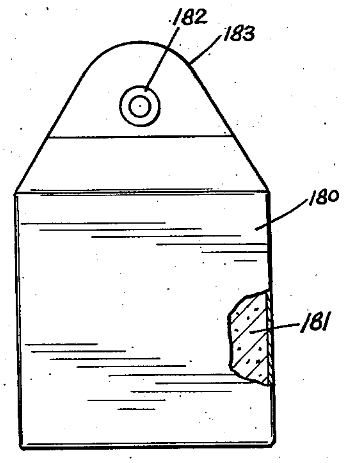
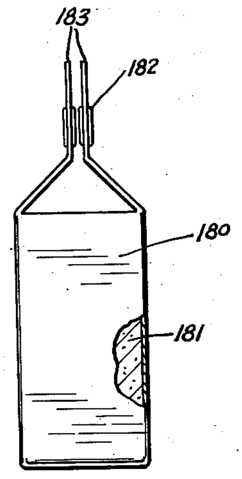
FIG. 18 FIG. 19
INVENTORS
OTTO C. WINZEN
BY RAYMOND C. HAWKINS
Moore, White & Burd
ATTORNEYS United States Patent Office 2,967,677
Patented Jan. 10, 1961

2,967,677

APPARATUS FOR LAUNCHING BALLOONS

Otto C. Winzen, St. Paul, and Raymond C. Hawkins, Minneapolis, Minn., assignors to Winzen Research, Inc., Minneapolis, Minn., a corporation of Minnesota Filed May 13, 1957, Ser. No. 660,022

1 Claim. (Cl. 244—2)

By this method and by this apparatus it is feasible for the first time to launch balloons directly from aircraft. While the principal uses for such method and apparatus are for making radar detection and radar directed anti-aircraft fire against planes difficult for the enemy (as by launching radar reflective balloons from bombing planes during their missions) for radar training of personnel in early warning systems and training stations, etc., there are many other applications where such method and apparatus may be used. For example, balloons may be launched carrying scientific instruments from points otherwise inaccessible and not quickly reached by other means; balloons may be launched from desired points carrying observation equipment such as cameras, television cameras, etc.; and balloons may be launched from desired points carrying jamming equipment for radar, radio and/or navigation devices, etc.

According to the method of this invention, the balloon to be launched is transported in unitary confinement with a parachute, inflation means, and control assembly to the launching point or site, by aircraft, the unitary assembly is released from the aircraft and the parachute extended to deaccelerate the load, the balloon inflated, the inflated balloon released from the unitary assembly and the remainder of the unitary assembly jettisoned by the parachute.

The apparatus of this invention comprises the new and useful unitary container assembly and cooperative balloon together with the new and useful structural features thereof.

It is therefore an object of this invention to provide a new and useful method and apparatus for launching balloons from flying aircraft.

A further object of this invention is to provide a new and useful method and apparatus for providing an airborne radar reflective target.

Still a further object of this invention is to provide a new and useful method and apparatus for delivering a balloon to a desired airborne position.

Still a further object of this invention resides in the structure of the unitary container and of the balloon itself.

Other and further objects of the invention reside in the structural details of the inflation and release apparatus, the structural details of the various controls therefor, the method and structure for disposing of the container after the balloon is inflated, the structural details of the balloon itself, the gas generation system and the timer assembly and releasing structure, as well as the unitary container.

Still other objects of this invention are those inherent and apparent in the method and apparatus as described, pictured and claimed.

To the accomplishment of the foregoing and related ends, this invention then comprises the features hereinafter fully described and particularly pointed out in the claim, the following description setting forth in detail certain illustrative embodiments of the invention, these being indicative, however, of but a few of the various ways in which the principals of the invention may be employed.

The invention will be described with reference to the drawings in which corresponding numerals refer to the same parts and in which:

Figure 1 is a schematic perspective view of the unitary container assembly of the invention being launched from transporting aircraft;

Figure 2 is a view similar to Figure 1 but showing the container with its supporting parachute opened and released from the static line of the aircraft to carry the load, and preliminary to balloon inflation;

Figure 3 is a view showing further progress of the unitary container from the aircraft, and showing initial inflation of the balloon and jettison of certain parts;

Figure 4 is a view of the balloon as inflation is completed and as it is released from the remainder of the assembly;

Figure 5 is an elevational view of the balloon as inflated;

Figure 16 is a plan view of the timer assembly of the instant invention;

Figure 17 is an elevational view thereof;

Figure 18 is a front elevational view of the ballast container utilized as described; and Figure 19 is an end view thereof.

Figure 1:
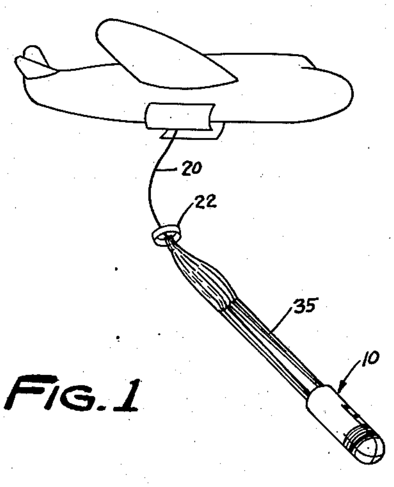
Figures 1–5 show five steps in the method of launching and inflating the balloon.

The unitary assembly or container of this invention, generally designated 10 (as is illustrated in Figures 6–9), is composed of two major subassemblies; the gas cylinder-housing assembly generally designated 11, and the control-balloon-parachute assembly generally designated 12. The gas cylinder housing subassembly 11 is in turn made up of two other subassemblies, the housing 13, a steel cylinder having a length approximately three times the diameter thereof, and the gas cylinder 14. To housing 13 are permanently attached the platform supports, attachment and carrying straps and plates, eyebolts for hooking the container 10 to a bomb rack, and a directional transfer means for the gas valve operating rope, etc. as later explained.

The gas cylinder 14 is provided with its wire wrapping, gas valve, operating rope sheave, swivelling quick connectors, etc. It comprises the other of the two subassemblies for the gas cylinder housing assembly 11.

The control-balloon-parachute assembly 12 is made up of three subassemblies: the platform assembly 15, the balloon assembly 16, and the parachute assembly 17. The parachute and balloon assemblies are attached to the platform assembly.

Figure 13:
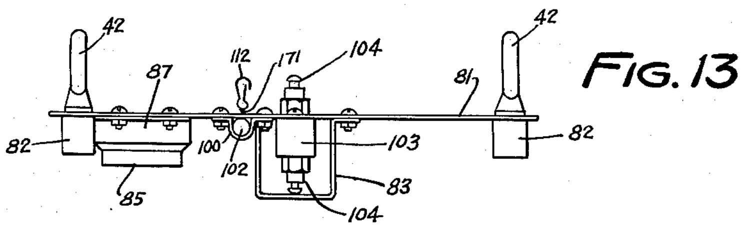
Figure 13 is an elevational view of the platform assembly or control assembly of the instant invention with the wiring and battery omitted.
Figure 14:
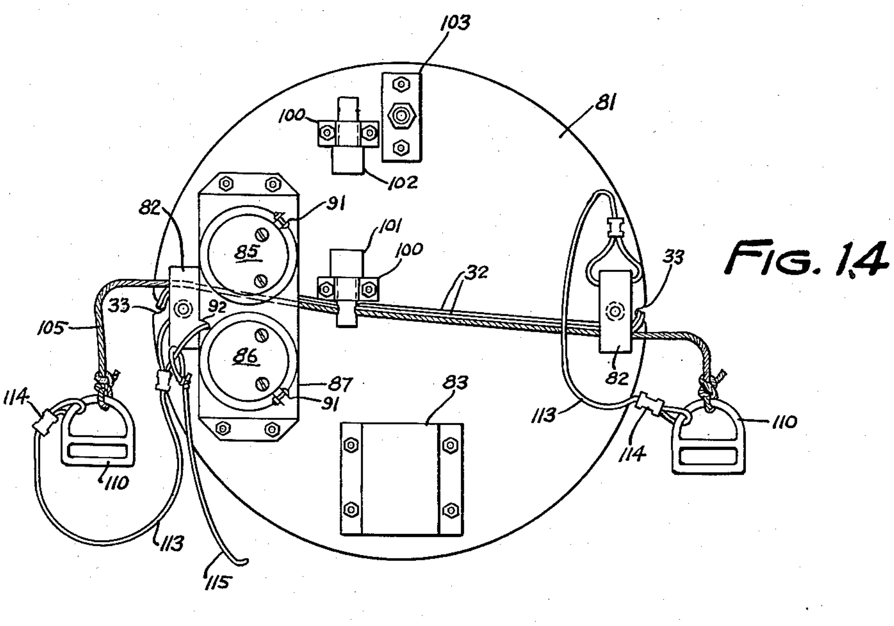
Figure 14 is a bottom plan view thereof.
Figure 15:
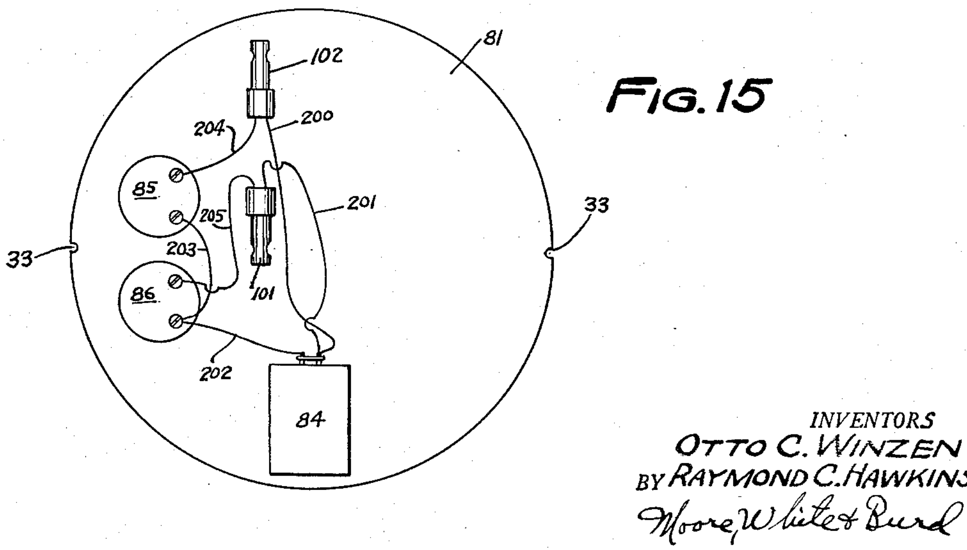
Figure 15 is a schematic view similar to Figure 14 and showing the electrical circuit connections of the instant invention.

The platform assembly as best shown in Figures 13–15 contains the controls and includes the balloon ejection delay and balloon release timers, cannons, battery and brackets, platform eyebolts, suspension cables, balloon and platform release ties, balloon snap, hose diffuser block and fittings, etc. as fully described later.

The balloon assembly 16 includes the hose diffuser, the balloon inflation tube and the balloon.

The parachute assembly 17 includes the parachute and attached risers, static line, pack and cover, as now further described.

Figure 6:
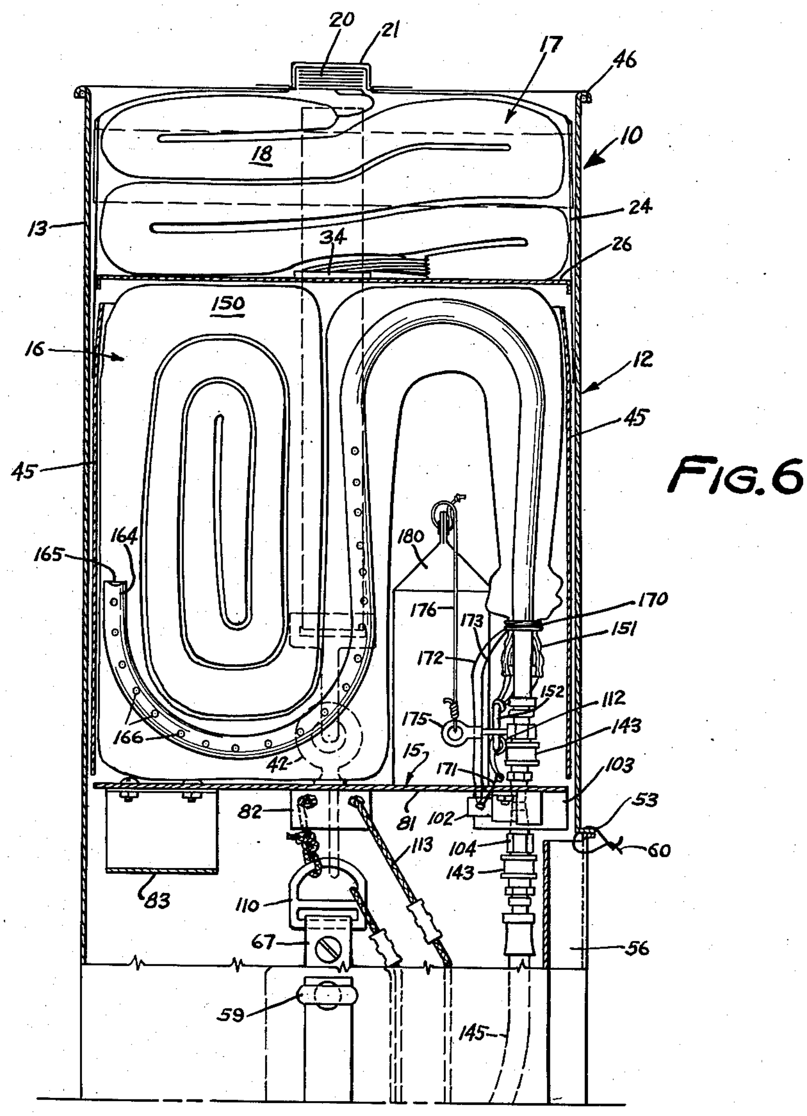
Figure 6 is a modified vertical sectional view of the upper half of the unitary container assembly of the balloon and attendant structure in position therein.
Figure 8:
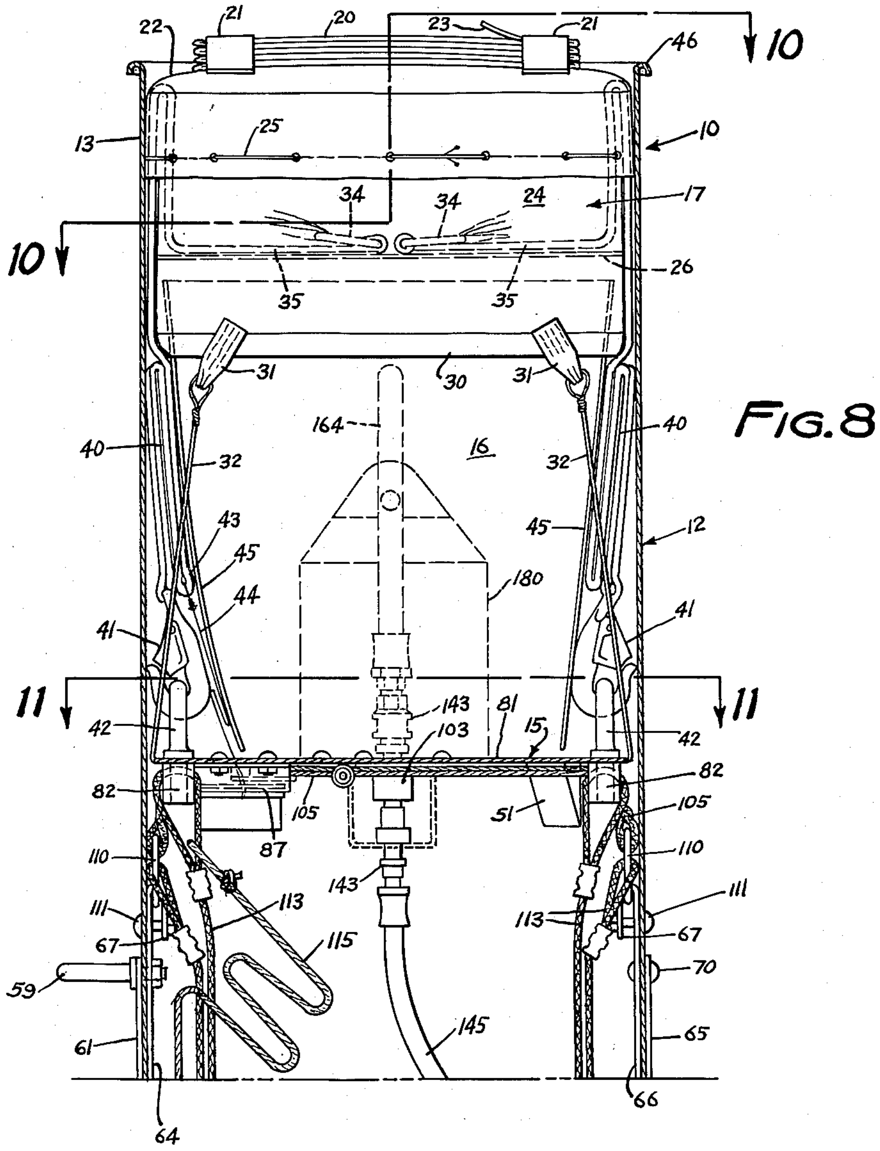
Figure 8 is a view similar to Figure 6 but in section taken at right angles thereto.

The parachute pack or assembly 17, best shown in Figures 6 and 8, includes a static line 20 positioned in alternate courses in hesitator loops 21 stitched or otherwise secured by extending flaps to the cover or cap 22. Cover or cap 22 is positioned interior of the top of the housing 13. The static line 20 is of suitable fabric, nylon, or other material and has an extending end 23 which may be secured to any convenient portion of the aircraft from which the container 10 is to be delivered or otherwise retained with the aircraft as the container is ejected therefrom for control of the streaming out of the parachute. It provides for positive release of the parachute.

The cover or cap 22 is of suitable material, usually of canvas, and provides a downwardly turned member provided with a plurality of apertures in which are situated grommets, which are positioned over cooperating apertures and grommets in the parachute assembly body 24, of like material as the cap. The cap 22 is substantially identical with the cap 14 illustrated in Figure 12 of the copending application of Otto C. Winzen, Donald L. Foster, and Verner E. Suomi, Serial No. 669,734, for Method and Apparatus for Tracking Hurricanes or the Like, filed July 3, 1957, now abandoned, and will not be described in further detail since it forms no part of this invention per se. It is provided with a central aperture through which the other end of static line 20 penetrates and is secured thereto.

Body 24 is similar to member 64 shown in Figures 13 and 14 of said application but of considerably shorter axial extension.

Through the cooperating grommets in body 24 and cap 22 is threaded a first break-tie 25 which is thus positioned alternately interior and exterior of the cap 22. The two ends of the tie are tied or otherwise secured to form a closure joining the cap to the body 24. When the static line is initially withdrawn from the hesitator loops 21, it will exert through its connection with cap 22 a pull thereon which will serve to sever the first break-tie 25 allowing the parachute to stream out to the position of Figure 1.

The body 24 comprises a right circular cylindrical section or pack with reference particularly to Figure 8, has an open top and an open bottom, and is divided by a hard shelf or partition 26, into upper and lower compartments. It has a diameter approximately 2½ times its height.

The bottom periphery of the body 24 is provided with a folded back or taped reinforced edge 30 to which is secured by sewing or otherwise, four slings 31, two of which are shown in Figure 8. Opposing slings are each attached to one end of a cord 32 which cord serves as a pack release tie. The release ties 32, only one of which is shown, pass under platform 81 as shown in Figure 14 to secure it in position and are seated in the notches 33 in the platform 81.

The two cords 32 thus serve to anchor the body 24 as shown in Figure 8 and when severed permit the body 24 to emerge from the housing 13.

The shroud lines of the parachute 18 are attached to a pair of opposed parachute risers 35 which extend upwardly as shown in Figure 8 over the upper edge 36 of body 24 and continue downwardly, each being provided with two reverse folds 40.

To the bottom end of each riser is secured a snap hook 41 connected to platform eyebolt 42. Attached to loop 43, formed in one of the risers 40, the left riser with respect to Figure 8, is a pull pin cord 44, tied thereto at one end and at the other end to a pull pin, so that after break-tie 25 breaks (permitting the parachute to stream out) the parachute will exert force on the risers 35 which will prolong the reverse folds 40, extend cord 44 and pull the pull pin connected thereto to start the timing assembly.

A pair of fiberboard or other suitable shields 45, each comprising somewhat more than half the circumference of cylinder 13 and the width of which is shown in Figure 8, extends between the underside of shelf 26 and the overside of platform assembly 15 and serves to protect the balloon folded in the chamber formed by shelf 26, platform assembly 15 and cylinder 13, as shown in Figure 8.

When the parachute is in the packed position of Figure 8, the shroud line secured to D-rings 34 are positioned in alternate courses in the hesitator loops secured to the upper surface of the shelf 26.

Figure 7:
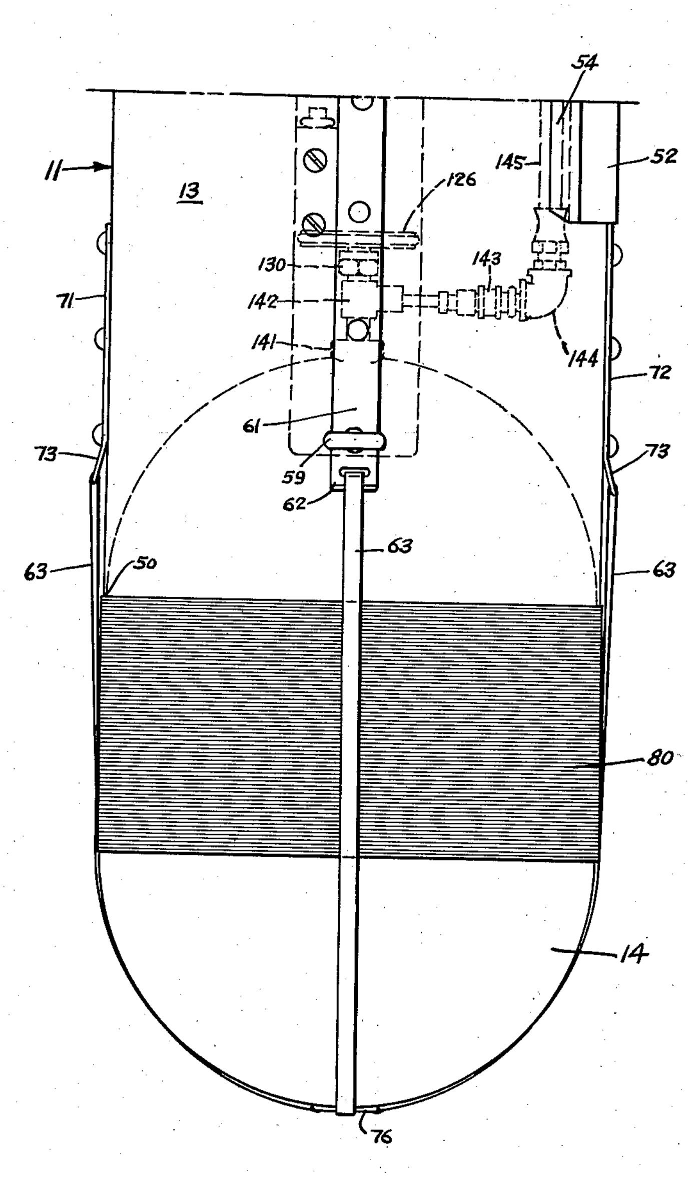
Figure 7 is an elevational view of the bottom half of the assembly of Figure 6.
Figures 10, 11, 12:
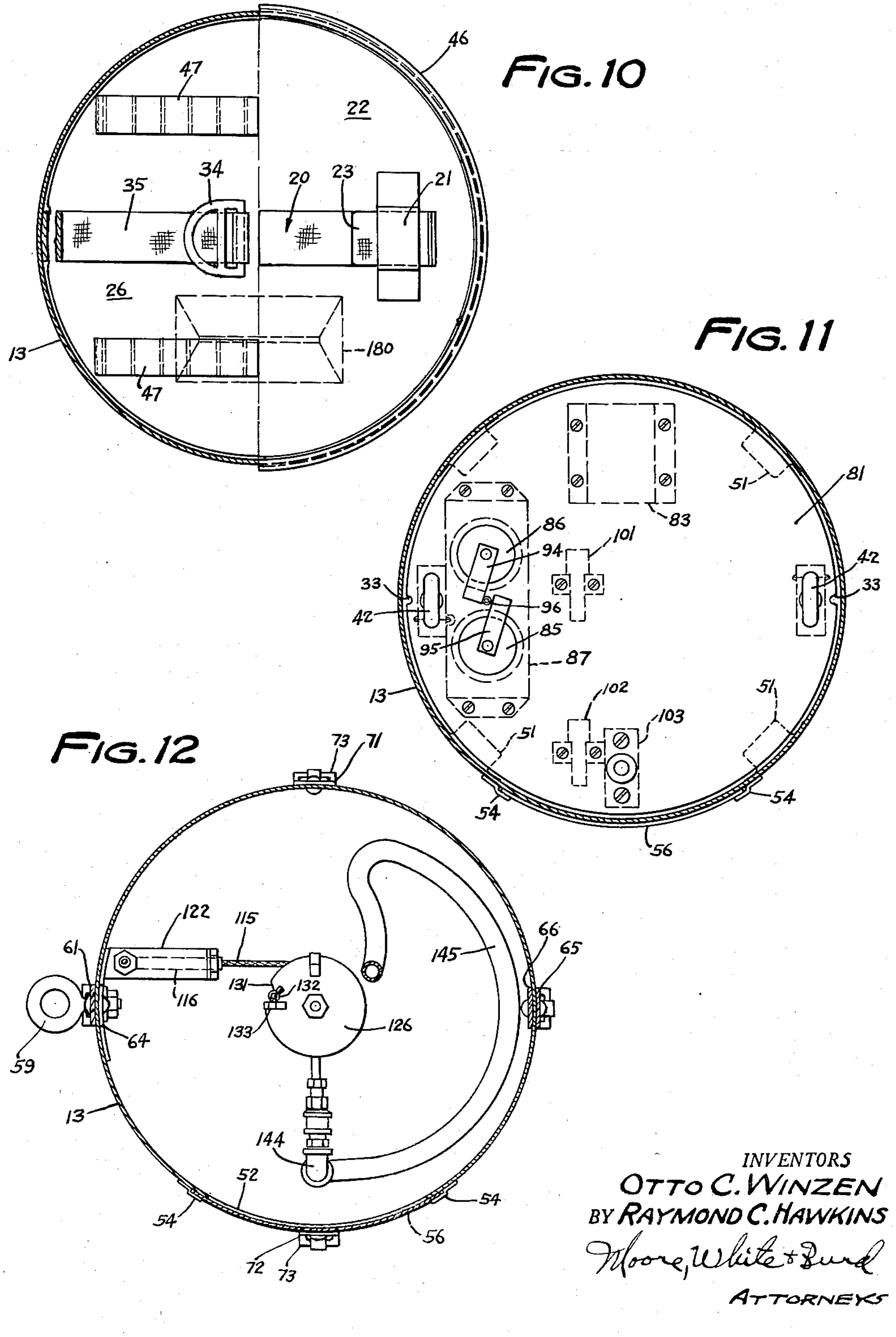
Figure 10 is a view taken along the line and in the direction of the arrows 10—10 of Figure 8.
Figure 11 is a modified horizontal sectional view taken along the line and in the direction of the arrows 11—11 of Figure 8.
Figure 12 is a modified horizontal sectional view taken along the line and in the direction of the arrows 12—12 of Figure 9.

The housing 13 as seen best in Figures 6 and 7 comprises a right cylindrical section usually of steel with a rolled top edge 46 and straight bottom edge at 50. Secured adjacent the midsection thereof for supporting the platform assembly 15 are four platform supports 51 comprising four channel shaped members (in plan view) having opposed and outwardly directed flanges. These are secured to the interior of the housing 13 as shown in Figure 11 and have a wedge-shaped elevational view as shown in Figure 8. The housing is provided with a rectangular aperture at 52 having a ledge 53 (Figure 6) at the top thereof and a pair of vertical guides 54 positioned one on either side thereof (Figures 7 and 12) for positioning a door 56 to close the aperture as shown in Figure 6. Thus, the door is provided with a top ledge cooperating with ledge 53 and having a cooperative aperture so that a door tie 60 may be passed through ledge 53 and door 56 to tie the same in the position shown in Figure 6. The door may thus be slid upwardly under the guides 54 and locked in position by tie 60 to close the aperture 52.

A pair of loading eyebolts 59 are each fastened to the midsection of the housing 13 in vertical aligned relationship and to a loading strap 61 which comprises an elongated rectangle of steel or other reinforcing material (slightly curved in cross section to conform with the housing surface) having a slightly outwardly turned end 62 provided with a slot for the reception of one end of a cylinder band 63.

Figure 9:
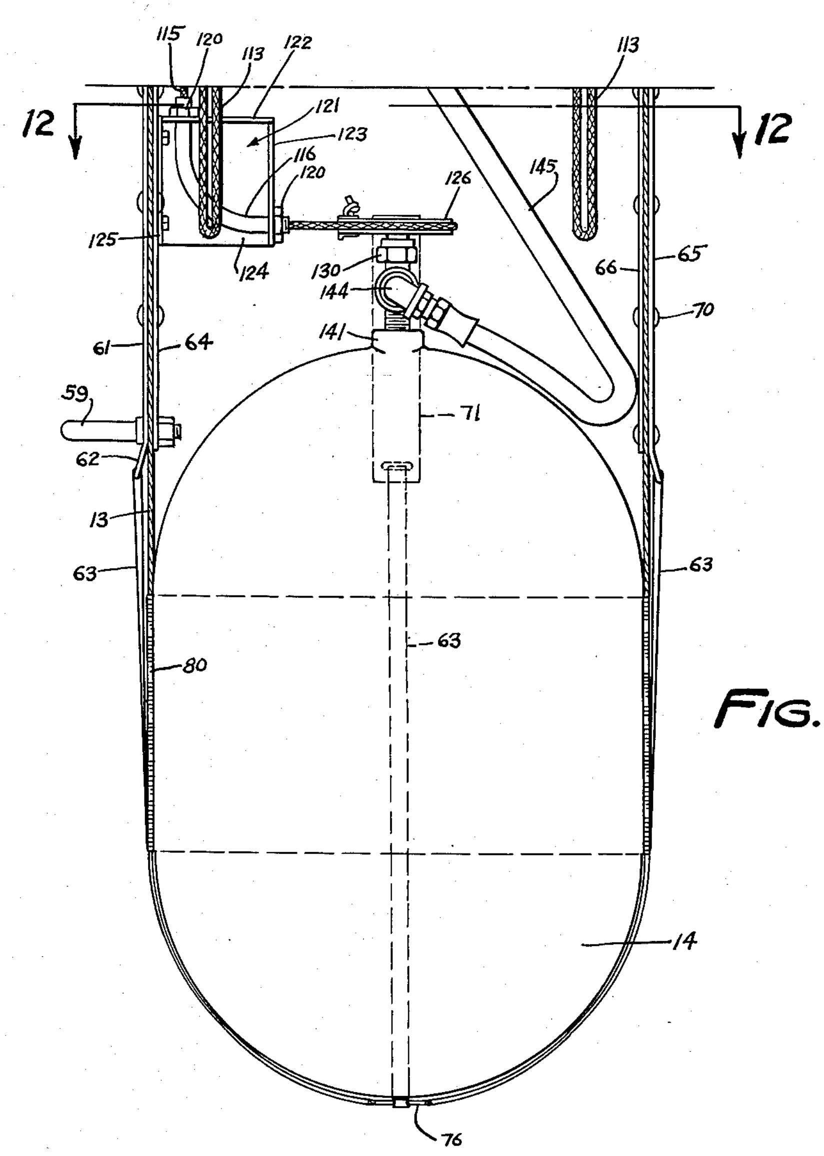
Figure 9 is a continuation thereof showing the bottom part of the assembly.

Positioned behind the strap 61 and interior of the housing 13 and secured to housing 13 by nuts on bolts 59 is a loading strap backing plate 64 as shown in Figures 7 and 9, having an inturned end 67. Positioned in opposed relation with reference to strap 61 is a substantially identical strap 65 and substantially identical backing 66 but riveted together through housing 13 by rivets 70, as shown in Figure 9. Thus, if straps 61 and 65 and corresponding backing plates 64 and 66 are viewed in plan as shown in Figure 12, they are in 180 degree relation.

On a diameter at right angles to the diameter extending between straps 61 and 65, are straps 71 and 72 each having slightly outwardly turned ends 73 provided with a slotted aperture for securing the ends of additional bands 63 therein.

Thus, four cooperating bands 63 each comprising a doubled back steel strap having its ends crimped together secured by other suitable means are connected to a band ring 76 which ring is positioned beneath the rounded or hemispherical bottom of gas cylinder 14. The gas cylinder 14 is of steel or other material able to take lifting gas under pressures of the order of 2400 p.s.i.g., is wire wound at 80 to provide greater strength, the upper strand of winding providing a shoulder against which the lower edge 50 of the cylinder 14 seats. The gas used is helium, hydrogen, or other suitable lifting gas.

Thus the straps 63 serve to cradle the cylinder 14 immovably with respect to the housing 13 so that it provides a bottom end closure therefor.

The platform assembly 15 comprises a platform 81 on which the various controls are secured and which is itself secured to the platform eyebolts 42 by platform fittings or blocks 82. Each of the blocks 82 (Figure 6) is provided with a pair of channels or recesses therein, one positioned on either side of a threaded aperture receiving the threaded shank of eyebolt 42 and through each of which a cable passes.

Each of the recesses in the block 82 is provided with a center crown so that its depth at the edges of the block is greater than its depth at the center.

The blocks 82 serve to connect the eyebolts 42 to the platform and as guides for various cables as subsequently explained.

To the underside of the platform 81 is bolted a battery carrier 83 in which is positioned a battery 84, carrier 83 (Figures 13 and 14) providing a channel member having opposed and outwardly turned edge flanges by which it is secured by bolts or otherwise to the platform 81. A timer tray 87 supports timers 85 and 86 in position beneath the platform. Timer 85 is a balloon release timer and timer 86 is a balloon ejection delay timer. The timer tray 87 likewise is bolted to the bottom of the platform 81 by opposed and outwardly directed flanges and provides a channel member having apertures in the bottom thereof through which protrude the timers 85 and 86. They are each maintained in position by an enlarged shoulder 90 positioned above the central web of the timer tray and a cooperating adjustable collar 91 positioned therebelow. The tray is notched at 92 for passage of cable 113 as shown in Figure 14. The platform 81 is provided with circular apertures directly above each of the timers for inspection thereof.

Each of the shoulders 90 has a recess for reception of a detent 93 secured to the bottom web of the timer as shown in Figures 16 and 17. Thus the timers are maintained fixedly in position. Each is provided with a timer arm 94 and 95 respectively which engages a pull pin stop 96 frictionally positioned in an aperture in the bottom web of tray 83. The arm 94 rotates in the direction of the arrow inscribed thereon and the arm 95 rotates in the direction of the arrow inscribed thereon. When the pin is pulled each arm begins to rotate under spring bias to make contact after a predetermined rotation and time lapse.

Also secured to the underside of the platform assembly 15 by clamps 100 is a pair of squib cannons 101 and 102, squib cannon 102 being fired by timer 85 and squib cannon 101 being fired by timer 86. Also secured to the underside thereof is a diffuser mounting block 103 having a central threaded aperture in which is threaded the male members or nipples 104 of two quick connectors 143.

Passing through the cutting orifice of the squib cannon 101 are three cords, a platform release tie 105 and two pack release ties 32.

The squib cannons 101 and 102 are similar to the cannon used in the aforesaid copending application of Otto C. Winzen, Donald L. Foster and Verner E. Suomi, Serial No. 669,734, filed July 3, 1957, now abandoned, for Method and Apparatus for Tracking Hurricanes or the Like, and since they form no part of this invention per se will not be described in detail. It suffices to say that each comprises a cannon actuated plunger knife striking an anvil, and when striking the anvil serving to sever the cord or cords, cable or cables interposed between the knife and the anvil. Each cannon is actuated by electricity upon closing of the circuit established by either timer 85 or 86.

Platform release tie 105 passes through the aperture in cannon 101, through the bottom recess in the groove in the righthand block 82 and the upper recess or groove in the lefthand block 82 as shown in Figure 14. It passes between the timers 85 and 86. Each end of platform release tie 105 is tied to a D-ring 110 as shown which is in turn secured to the inturned end or clip 67 of plate backing 64. Each D-ring is secured in position by a nut and bolt 111. The platform release tie 105 thus serves to anchor the platform assembly 15 securely in the position of Figures 6 and 8 until severed whence the platform assembly 15 may rise under impetus from the parachute risers 35 to extended position slightly above the top edge 46 of housing 13. Positioned adjacent tie 105 is the pair of cords or cables 32 also of severable material, also adapted to be severed by cannon 101 and which form the pack release ties. These are severed simultaneously with platform release tie 105.

Cannon 102 serves similarly to cut a cord or balloon release tie 171 secured to a clip 112 which as shown in Figure 6 is positioned on the upper side of the platform assembly 15. Thus the cannon 102 supported by clamp 100 is positioned beneath the platform 81 and the clip 112 above platform 81. The cord or cable 171 is severed by the cannon 102 and is secured to the clip 112 by passing through the hole in platform 81. The clip 112 is attached to the harness ring 152 of the balloon as subsequently explained.

Secured to each one of D-rings 110 is a suspension cable 113 for the platform 81. Each cable 113 has one end secured to D-ring 110 and the other looped through one of the recesses in block 82 as shown in Figure 14. Thus the left suspension cable 113 has its end looped through the bottom recess of lefthand block 82; the right suspension cable has its end looped through the top recess of righthand block 82. Each looped end of cable 113, whether it be secured to the D-ring 110 or block 82 is maintained in position by a crimped keeper 114 as shown, although it may be tied or otherwise secured.

A valve pull cord 115 has one end attached to the end of one of the cables 113 attached to platform 81 (in this instance the left cable with respect to Figure 14). The other end of the valve pull cord severs to actuate the valve of cylinder 14.

The valve pull cord 115 extends downwardly as shown in Figure 9 through a cord guide tube or directional transfer tube 116 having threaded ends each engaged by a nut 120 which serve to secure it to a supporting bracket 121. Tube 116 is curved as shown in Figure 9 to provide a conduit for cable 115. Bracket 121 comprises a top horizontal flange 122, a first vertical flange 123 both secured to the rectangular member 124 and a second vertical flange 125 similar to but in opposed relation to flange 123. The flange 125 is bolted or otherwise secured to the backing 64 to support the bracket 121.

The bottom end of the cable 115 is passed around the operating rope sheave 126 connected to valve 130 so that a single turn of sheave 126 will open valve 130. The sheave 126 is provided with a slot at 131 in which the knotted end 132 of cable 115 is positioned and the cable is retained on the sheave 126 by friction cord-clips 133 which are U-shaped resilient clips. Valve 130 is of any suitable type opened by a single turn of the shaft to which sheave 126 is attached. It is threaded into threaded boss 141 of cylinder 14 and is provided with a T 142 to which is attached a swiveling quick connector 143 of a standard type such as that manufactured by Snap-Tite, Inc., of Union City, Pennsylvania. Such connector is a quick coupler exhibiting freedom to rotate about the axis of its coupling. The connector 143 is secured to an elbow 144 to which is attached a gas hose 145 for delivering gas from cylinder 14 to the diffuser block 103. The other end of hose 145 is attached to a similar swiveling quick connector 143 secured to the bottom nipple 104 of block 103. The connector 143 at the end of hose 145 attached to the cylinder 14 permits elongation of the hose 145 from the position of Figure 9 to the position of Figure 7 as the platform assembly 15 is elevated within and from the container 10.

The balloon 150 of this invention is a multiple gored balloon heat-sealed from gores of synthetic resinous material, in this instance polyethylene, and provided with a skirt appendix 151 and an interior load ring 152. The skirt appendix is tied off during inflation to prevent loss of lifting gas during inflation. A suitable balloon of this type is shown in Patent No. 2,756,948, issued July 31, 1956, to Otto C. and Vera H. Winzen, and either the radar reflective or non-radar reflective type may be used. Likewise a suitable radar reflective balloon is shown in co-pending application of Otto C. Winzen, Serial No. 480,508, for Radar Reflective Balloon, filed January 7, 1955, now abandoned.

The balloon 150 may be otherwise reinforced in any suitable manner to protect it from severe treatment and the gas supplied inflation apparatus are designed for rapid inflation.

It is provided in addition with an inflation tube 153, usually a lay flat tube of synthetic resinous material, of the same material as the envelope of the balloon itself, heat-sealed at one edge to one of the junctures 154 and between adjacent gores 155 and 156. The tube is sealed at end 160 and extends from a point approximately ⅔ the height of the balloon down to a point adjacent the open appendix thereof at 161. For the upper third to the upper half of its length is provided with double rows of opposed perforations 162 which provides means for diffusing the gas into the balloon envelope throughout its upper half without excessive unbalanced reaction forces. The balloon is folded in the compartment formed by shelf 24, platform 81, and housing 13 as best shown in Figure 6 to provide a coiled portion at the left-hand side of the housing and an extending tail secured to tube 164. Extending within the balloon in serpentine fashion is the insertable diffuser tube or perforated hose diffuser 164 of flexible fabric braided rubber hose having a closed end at 165 and rows of spaced opposed holes 166 throughout the upper half thereof which opposition nearly balances reaction forces of inflation and reduces tendency of the hose to whip. It cooperates with the tube 153 and is positioned therein. (Tube 154 is not shown in Figure 6.) The hose 164 is connected to a third quick swivel connector 143 on platform 81 as shown in Figure 6. The skirt 151 of the balloon is pulled back and tied by a tie 170 as shown in Figure 6 having extending ends 172 and 173 which pass through an aperture in platform 81 and likewise are severed by the explosion of cannon 102. Thus when cannon 102 is exploded it will release the clip 112 and also the tie 170 so that the hose 164 may withdraw from its cooperating hose 153.

The ring 152 has secured thereto a snap 175 which is tied to a core 176 in turn passed through the grommets of ballast container 180. Ballast container 180 is best shown in Figures 18 and 19 and comprises a rectangular bag, sack or box filled with suitable ballast 181 (such as shot) through the grommets 182 in the opposed drawn together flaps 183 of which is passed the cord 176.

Of course it is to be understood that substituted for the ballast container may be various scientific instruments, cameras, television cameras, jamming equipment for radar, radio, and/or navigation devices, etc. to constitute the load.

The circuitry is best shown in Figure 15. There it is seen that the cannon 102 is attached to battery 84 by a line 200 and cannon 101 is attached to the same terminal of battery 84 by line 201. The other terminal of the battery is attached via line 202 to timer 86 and via line 203 to timer 85. Timer 85 is in turn attached via line 204 to cannon 102 and via line 205 to cannon 101. Thus, when the arm 94 of timer 85 has rotated according to its predetermined lapse it will establish a connection between the battery and via lines 200 and 202 and 204 to fire cannon 102. When this happens severance is accomplished as described previously. When timer 85 fires cannon 102, timer 86 has previously established a connection via line 202, 205 and 201 to cannon 101 to accomplish its severance function also described previously.

The basic sequence of operation is briefly as follows: the unitary container 10 is dropped from the bomb rack of a carrying aircraft; the static line 20 deploys the parachute 18; the static line separates from the parachute; the parachute slows the device to a terminal velocity, the balloon 150 is then ejected, the balloon begins to inflate; inflation is completed; the balloon and ballast are then released or launched from the container; and the launching device parachutes to earth.

Figure 2:
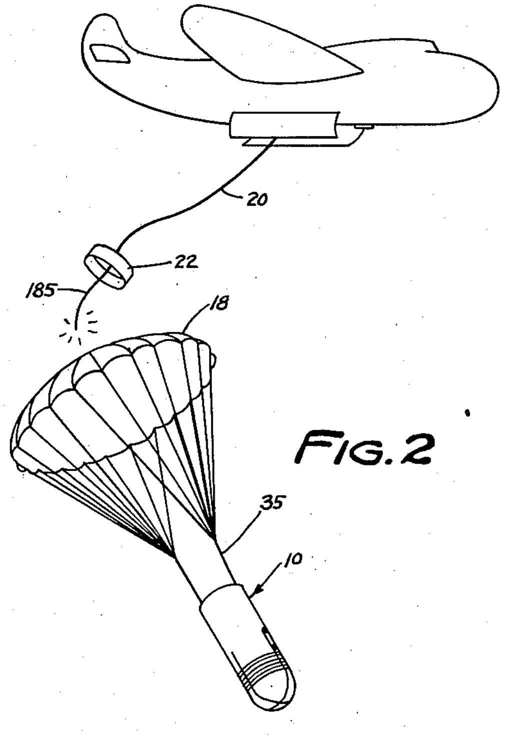
Figure 3:
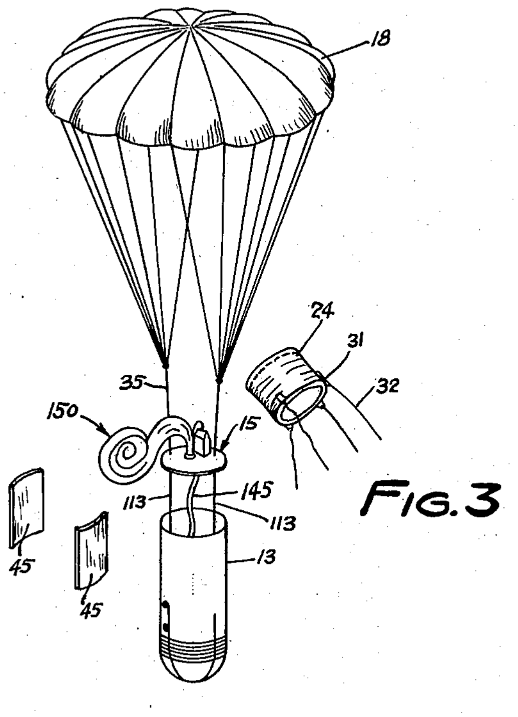
Figures 4, 5:
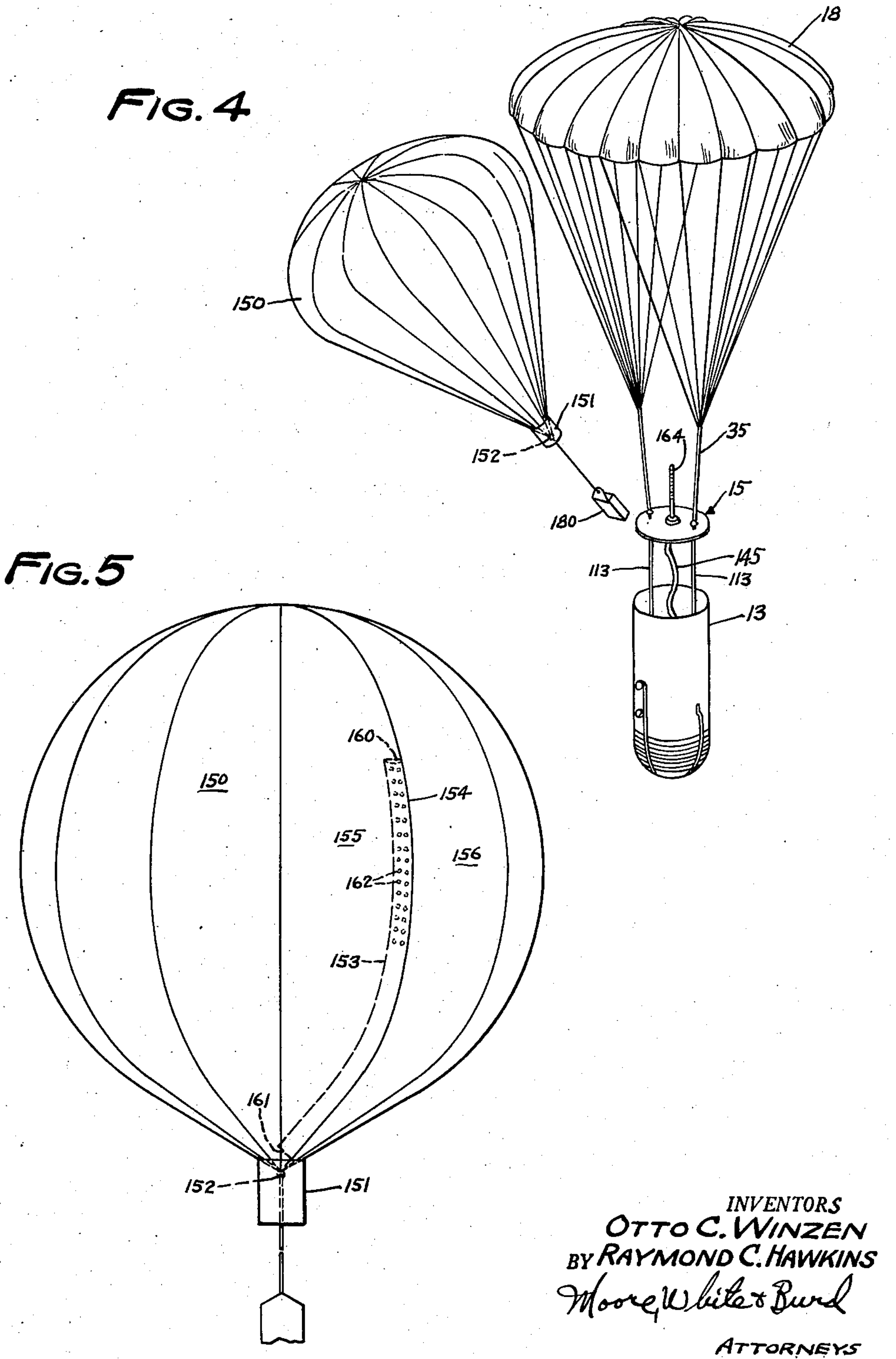

Specifically, in operation, the unitary assembly or container 10 is assembled as shown in Figures 6–9 and the access door 56 closed and maintained in closed position by the tie 60. The container is then transported to the desired upper air launching site usually by suitably attaching the loading eyebolts 60 to the bomb bay of the aircraft. The end 23 of the static line 20 is secured for retention in the aircraft. At the desired site the container 10 is released from the aircraft; the static line 20 remains secured thereto. As it is released, the static line is progressively pulled from the hesitator loops 21 to the limit of its length, the first break-tie 25 holding the cover 22 and body together severs and the cover or cap 22 is pulled off the body 24 and out of the container 10. This streams out a parachute 18 from the pack to the position of Figure 1 and extends the risers 35 into prolongation, the shroud lines being pulled from the hesitator loops 47 as the parachute is streamed out. The snatch force of the parachute operating through pull pin cord 44 attached to one of the risers 35 at loop 43 pulls the pin 96 from the aperture in timer tray 83 and the timer arms 94 and 95 commence to rotate in the direction of their respective arrows as shown in Figure 17. The timers thus begin the timing sequence. When the risers 35 are fully extended to the position of Figure 2 and the parachute opens, the shock will sever the second break-tie 185 which connects cap 22 to parachute 18 and the device will assume the position shown in Figure 2. The parachute then decelerates the fall of load or container 10. Next, after a suitable calculated lapse of time the timer 86 closes its contacts, establishing the circuit to squib cannon 101 firing the cannon 101. This severs the lines 32 and 105 disassociating the body portion 24 of the pack assembly 17 from its connection with platform assembly 15, disconnecting the tied down platform assembly 15 from rings 110 and permitting the housing 13 to drop below the platform assembly 15 to the limit of the suspension cables 113. This permits the abrasion shields 45 and the body 24 to fall away as illustrated in Figure 3 and the assembly to assume that position. The balloon then commences to roll off the platform as shown in Figure 3, because of its elastic memory. The rising of the platform through cord 115 turns sheave 126 a three-quarter turn which actuates valve 130 to deliver gas under pressure to conduit or hose 145. As the platform assembly assumes the position of Figure 3 the swivel connectors connecting the hose 145 permit elongation of the hose from the position of Figure 9 to the position of Figures 3 and 7. Inflation of the balloon thus commences and this assists in rolling the balloon off the platform. After a suitable lapse of time, the timer 85 actuates cannon 100 severing line 172 from 173 and permitting tie 170 to unwrap from the appendix skirt 151, thus releasing frictional engagement of the balloon material with the base of the hose 164. Severance of the tie 172 also releases clip 112 which releases the balloon from the platform assembly 15. The released inflated balloon, having a positive lift pulls off the hose diffuser 164 and floats free of the launching device as shown in Figure 4. Balloon launching is then complete as shown in Figure 5 and the housing 13 supported by parachute 18 floats to earth.

It is apparent that many modifications and variations of this invention as hereinbefore set forth may be made without departing from the spirit and scope thereof. The specific embodiments described are given by way of example only and the invention is limited only by the terms of the appended claim.

What is claimed is:

In combination, a cylindrical container having open top and bottom ends, a gas containing cylinder serving as a closure at the bottom end, a circumferential reinforcement for said gas containing cylinder providing a shoulder abutting said bottom end of said container, sling means securing said gas containing cylinder thereto, a first cover member secured to the other end of said container and secured to a body member by a break-tie, said body member providing a first partition, said partition in cooperation with said first cover member providing a compartment in which a parachute is collapsed, said parachute being secured to said cover by a second break-tie, said partition forming together with said cylinder and a second movable partition a second compartment in which a balloon in collapsed condition is positioned, said body member being secured to said movable partition, said parachute being attached by means providing slack to said movable partition, said movable partition being initially anchored to said container, means for extending said parachute, means operative in response to the extension of said parachute for actuating a timer assembly, said timer assembly being secured to said movable partition, conduit means connecting said gas container cylinder to said balloon, and valve means for controlling the flow of gas therethrough, first explosion means controlled by said timer assembly for releasing said movable partition for movement toward the top of said container and for releasing said body member from said movable partition, said body member being secured to said container only by securance to said movable partition, means responsive to the movement of said platform for opening said gas valve to provide gas to said balloon, and second explosion means controlled by said timer assembly for releasing said balloon from said movable partition and for releasing said conduit means from said balloon.

References Cited in the file of this patent

UNITED STATES PATENTS

| | | |
|---|---|---|
| 1,572,889 | Degen | Feb. 16, 1926 |
| 1,894,954 | Johnson et al. | Jan. 24, 1933 |
| 2,463,517 | Chromak | Mar. 8, 1949 |
| 2,551,609 | Kohr | May 8, 1951 |
| 2,582,113 | Finken et al. | Jan. 8, 1952 |
| 2,628,307 | Lloyd et al. | Feb. 10, 1953 |
| 2,756,948 | Winzen et al. | July 31, 1956 |
| 2,764,369 | Melton | Sept. 25, 1956 |
| 2,798,683 | Swenson | July 9, 1957 |

FOREIGN PATENTS

| | | |
|---|---|---|
| 555,831 | Great Britain | Sept. 9, 1943 |